US012810424B2

(12) United States Patent
Fung et al.

(10) Patent No.: US 12,810,424 B2
(45) Date of Patent: Nov. 24, 2026

(54) SYSTEM AND METHOD FOR DEEP LEARNING-BASED SHOULDER LESION MEASUREMENT

(71) Applicant: GE Precision Healthcare LLC, Waukesha, WI (US)

(72) Inventors: Mei Kei Maggie Fung, Jersey City, NY (US); Chitresh Bhushan, Schenectady, NY (US); Dattesh Dayanand Shanbhag, Bangalore (IN); Laura Carretero Gómez, Munich (DE); Sabrina Wei Qi, Palo Alto, CA (US); Justin Ryan Cheung, Milwaukee, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 175 days.

(21) Appl. No.: 18/972,228

(22) Filed: Dec. 6, 2024

(65) Prior Publication Data

US 2026/0162251 A1 Jun. 11, 2026

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2200/04* (2013.01); *G06T 2207/10088* (2013.01); *G06T 2207/20081* (2013.01); *G06T 2207/20084* (2013.01);
(Continued)

(58) Field of Classification Search
CPC . G06T 2207/30008; G06T 2207/30096; G06T 7/0012; G06T 2207/10088; G06T 2200/04; G06T 2207/20081; G06T 2207/20084; G06T 2207/20132; G06T 7/11
See application file for complete search history.

(56) References Cited

U.S. PATENT DOCUMENTS

2026/0083506 A1 * 3/2026 Lambers ................ A61B 34/10

OTHER PUBLICATIONS

Saliken et al., "Imaging methods for quantifying glenoid and Hill-Sachs bone loss in traumatic instability of the shoulder: a scoping review." GMC Musculoskeletal Disorders, 2015, 26 pgs.
(Continued)

*Primary Examiner* — Matthew C Bella
*Assistant Examiner* — Janice E. Vaz
(74) *Attorney, Agent, or Firm* — Fletcher Yoder, P.C.

(57) ABSTRACT

A method for shoulder lesion measurement includes obtaining three-dimensional (3D) medical imaging data of a shoulder of a subject. The method also includes utilizing a first trained neural network to localize a glenohumeral joint in the 3D medical imaging data of the shoulder to a localized view utilizing cylinder segmentation. The method further includes utilizing a second trained neural network to detect a plane containing a circle encompassing a glenoid within the localized view, to utilize circle/ring segmentation to predict a ring segmentation mask from the localized view, and to predict a glenoid surface segmentation mask from the localized view. The method even further includes utilizing a defect algorithm to calculate an inferior glenoid diameter, a width of a bone lesion, and a glenoid track width based on the ring segmentation mask and the glenoid surface segmentation mask.

20 Claims, 16 Drawing Sheets

(52) U.S. Cl.
CPC ............... *G06T 2207/20132* (2013.01); *G06T 2207/30008* (2013.01); *G06T 2207/30096* (2013.01)

(56) References Cited

OTHER PUBLICATIONS

Aydingöz et al., "Glenoid Track Assessment at Imaging in Anterior Shoulder Instability: Rationale and Step-by-Step Guide," RadioGraphics, Musculoskeletal Imaging, Aug. 2023, 12 pgs.
Stryker, Blueprint Digital Platform Pre-operative solutions, 2023, 7 pgs.

* cited by examiner

336

338 340 342 344 346 348 350 352 354

| Case | Dice Score, Ring | Dice Score, Glenoid Surface | D (ground truth) in mm | D (predicted) in mm | D delta (ground truth - predicted) in mm | d (ground truth) in mm | d (predicted) in mm | d delta (ground truth - predicted) in mm |
|---|---|---|---|---|---|---|---|---|
| Ex25569 Series 28075 | 0.287 | 0.701 | 30.3 | 29.863 | 0.437 | 3.4 | 4.413 | -1.013 |
| Ex26393 Series 28075 | 0.486 | 0.585 | 25.2 | 27.135 | -1.935 | 0 | 0.485 | -0.485 |
| Ex27360 Series 28075 | 0.504 | 0.729 | 26.5 | 28.561 | -2.061 | 0 | 1.116 | -1.116 |
| Ex28656 Series 26075 | 0.552 | 0.745 | 26.5 | 29.427 | -2.927 | 0 | 0.353 | -0.353 |
| Ex29169 Series 25075 | 0.49 | 0.683 | 25.2 | 27.183 | -1.983 | 0 | 0.805 | -0.805 |
| Ex29345 Series 25075 | 0.484 | 0.679 | 26.7 | 28.051 | -1.351 | 4.3 | 4.302 | -0.002 |

FIG. 9

SYSTEM AND METHOD FOR DEEP LEARNING-BASED SHOULDER LESION MEASUREMENT

BACKGROUND

The subject matter disclosed herein relates to medical imaging and, more particularly, to a system and a method for deep learning-based shoulder lesion measurement.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During MRI, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

The most common form of shoulder instability is anterior shoulder dislocation. Bone lesions in the anteroinferior glenoid surface (known as Bankart lesion) and in the posterolateral humeral head (known as a Hill-Sachs lesion) have been linked closely with anterior shoulder dislocation, and their severity is closely related to the recurrence of shoulder dislocation. The degree of these lesions' severity is used to prescribe the correct surgery of arthroscopic Bankart repair, Latarjet procedure, remplissage, and/or humeral-side repair. These surgical procedures vary in levels of invasiveness and complexity. However, measuring the Bankart lesion and Hill-Sachs lesion can be time-consuming.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for shoulder lesion measurement is provided. The computer-implemented method includes obtaining, via a processing system including one or more processors, three-dimensional (3D) medical imaging data of a shoulder of a subject. The computer-implemented method also includes utilizing, via the processing system, a first trained neural network to localize a glenohumeral joint in the 3D medical imaging data of the shoulder to a localized view utilizing cylinder segmentation. The computer-implemented method further includes utilizing, via the processing system, a second trained neural network to detect a plane containing a circle encompassing a glenoid within the localized view, to utilize circle/ring segmentation to predict a ring segmentation mask from the localized view, and to predict a glenoid surface segmentation mask from the localized view. The computer-implemented method even further includes utilizing, via the processing system, a defect algorithm to calculate an inferior glenoid diameter, a width of a bone lesion, and a glenoid track width based on the ring segmentation mask and the glenoid surface segmentation mask.

In another embodiment, a system for shoulder lesion measurement is provided. The system includes a memory encoding processor-executable routines. The system also includes a processing system including one or more processors and configured to access the memory and to execute the processor-executable routines, wherein the processor-executable routines, when executed by the processing system, cause the processing system to perform actions. The actions include obtaining three-dimensional (3D) medical imaging data of a shoulder of a subject. The computer-implemented method also includes utilizing a first trained neural network to localize a glenohumeral joint in the 3D medical imaging data of the shoulder to a localized view utilizing cylinder segmentation. The computer-implemented method further includes utilizing a second trained neural network to detect a plane containing a circle encompassing a glenoid within the localized view, to utilize circle/ring segmentation to predict a ring segmentation mask from the localized view, and to predict a glenoid surface segmentation mask from the localized view. The computer-implemented method even further includes utilizing a defect algorithm to calculate an inferior glenoid diameter, a width of a bone lesion, and a glenoid track width based on the ring segmentation mask and the glenoid surface segmentation mask.

In a further embodiment, a non-transitory computer-readable medium, the computer-readable medium including processor-executable code that when executed by a processing system including one or more processors, causes the processing system to perform actions. The actions include obtaining three-dimensional (3D) medical imaging data of a shoulder of a subject. The computer-implemented method also includes utilizing a first trained neural network to localize a glenohumeral joint in the 3D medical imaging data of the shoulder to a localized view utilizing cylinder segmentation. The computer-implemented method further includes utilizing a second trained neural network to detect a plane containing a circle encompassing a glenoid within the localized view, to utilize circle/ring segmentation to predict a ring segmentation mask from the localized view, and to predict a glenoid surface segmentation mask from the localized view. The computer-implemented method even further includes utilizing a defect algorithm to calculate an inferior glenoid diameter, a width of a bone lesion, and a glenoid track width based on the ring segmentation mask and the glenoid surface segmentation mask.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 9 depicts a table summarizing quantitative results of a comparison of the disclosed techniques to ground truths, in accordance with aspects of the present disclosure;

DETAILED DESCRIPTION

Figure 1:
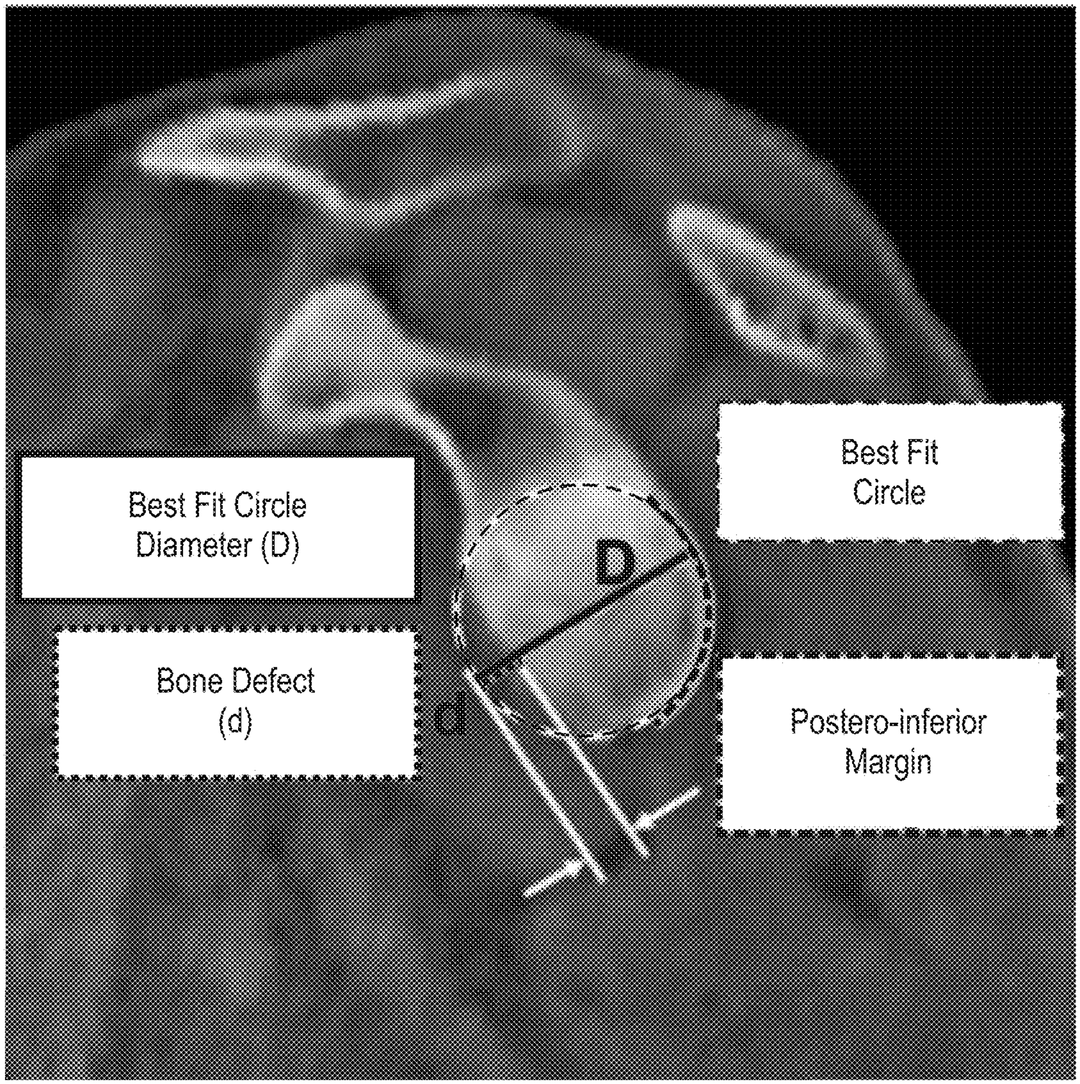
FIG. 1 depicts a magnetic resonance (MR) image having a Bankart lesion and metrics utilized for measuring a severity of the Bankart lesion, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

In the following disclosure, the techniques are discussed utilizing three-dimensional (3D) MRI data as the example image data. The techniques may also be utilized with computed tomography imaging volumes. The techniques are also discussed with respect to bone lesions in the anteroinferior glenoid surface. The techniques may also be utilized with bone lesions with respect to the posterolateral humeral head. The techniques may also be utilized for other musculoskeletal joints.

The present disclosure provides systems and methods for shoulder lesion measurement. In particular, a deep learning-based pipeline is utilized to automate Bankart lesion measurements given a 3D medical imaging volume (MR imaging volume acquired with an osteo specific sequence such as oZTEo) in order to improve the shoulder instability surgical diagnosis workflow. The disclosed systems and methods utilize an artificial intelligence (AI)-based approach model for glenoid defect measurement. The model is utilized to consistently find geometric and anatomical features in the shoulder. A two-step approach to segment fine features. In the first step, a first trained neural network (e.g., coverage network referred to as CoverageNet) is utilized for localization and generating a cropped field of view. In a second step, a second trained neural network (e.g., scan plane network referred to as ScanPlaneNet) is utilized for segmentation with cropped field of view. A defect algorithm is then utilized to calculate the metrics for determining Bankart lesion severity based on the segmentations. For example, the commonly used metric for Bankart lesion severity is glenoid track width (GT), which is defined as:

$$GT = 0.83D - d \tag{1}$$

where D represents inferior glenoid diameter, d represents anterior glenoid bone loss width (i.e., a width of the defect or lesion itself) as shown in FIG. 1 (an MR image of a shoulder having a Bankart lesion). In FIG. 1, the inferior glenoid diameter is represented by a best first circle diameter (D) within a best first circle (dashed circle in FIG. 1) located on the glenoid. The posteroinferior margin is indicated by a solid line in FIG. 1 located on the right side of the dashed circle. The anterior glenoid bone loss width is indicated by width (d) in FIG. 1. In the absence of lesions, the entirety of the glenoid (e.g., within the best circle) would be fully bone.

The disclosed embodiments provide an approach that is more generalizable to handle acquisition changes by offering geometric standardization. In addition, the approach is explainable by replicating the final segmentation represented in a same manner that a clinician would use in their practice. The disclosed embodiments provide an automatic diagnostic measurement process. The disclosed embodiments reduce the workflow time for measuring relevant clinical metrics used for surgical diagnosis.

Figure 2:
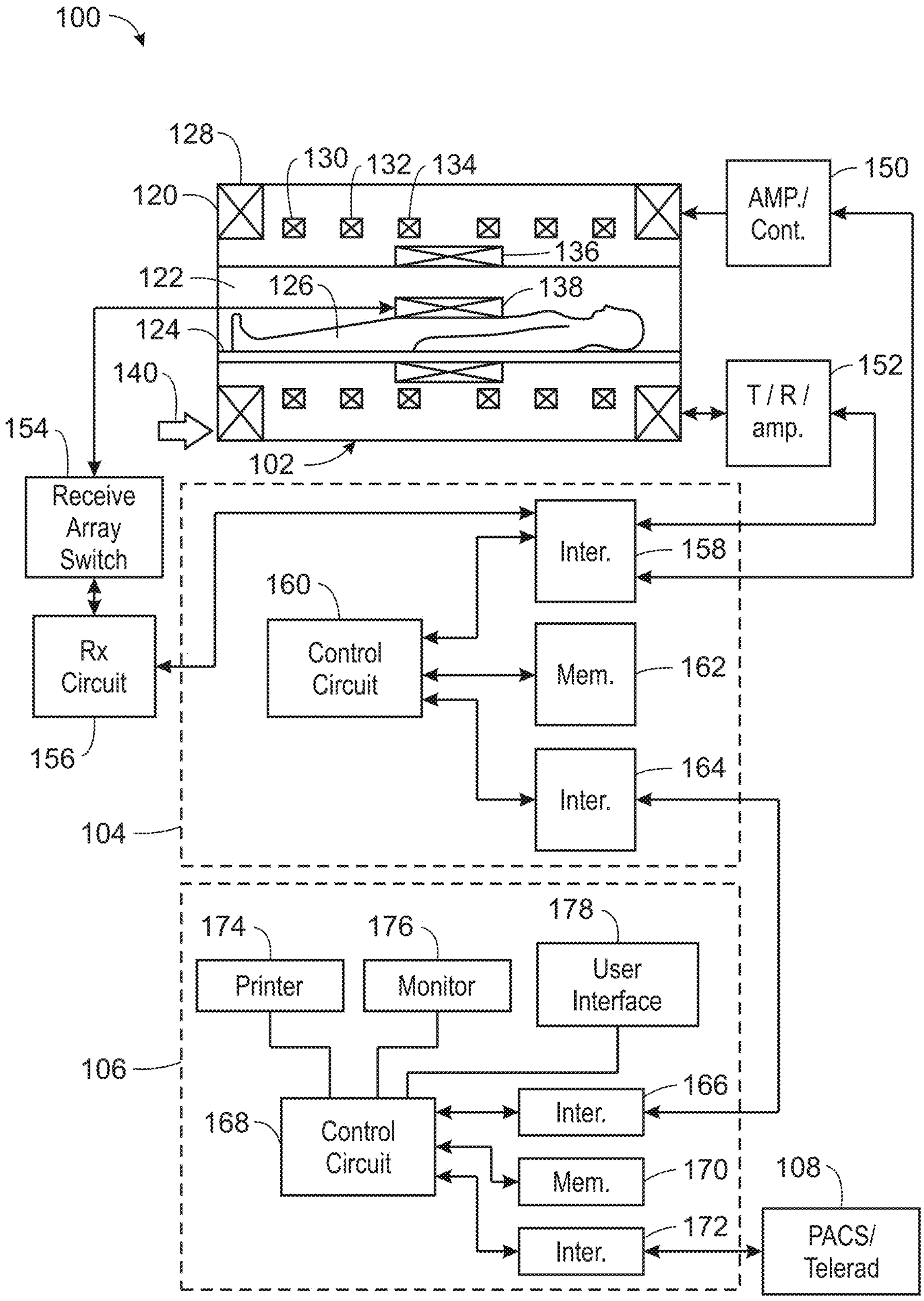
FIG. 2 illustrates an embodiment of a magnetic resonance imaging (MRI) system suitable for use with the disclosed technique, in accordance with aspects of the present disclosure.

With the preceding in mind, FIG. 2 a magnetic resonance imaging (MRI) system 100 is illustrated schematically as including a scanner 102, scanner control circuitry 104, and system control circuitry 106. According to the embodiments described herein, the MRI system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 (e.g., subject) to be positioned therein for imaging selected anatomy within the patient.

Scanner 102 includes a series of associated coils for producing controlled magnetic fields for exciting the gyromagnetic material within the anatomy of the patient being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the MRI system 100 and to store the processed image data for later reconstruction, display and transmission. The programming code may execute one or more algorithms that, when executed by a processor, are configured to perform reconstruction of acquired data as described below. For example, the algorithms may include a defect algorithm utilized to calculate the metrics for determining Bankart lesion severity based on the segmentations generated by an AI-based approach model (neural network structure having multiple trained neural networks) as discussed in greater detail below. In certain embodiments, the memory circuit 170 may store one or more neural networks. For example, the neural networks may include a first trained neural network (e.g., coverage network referred to as CoverageNet) for localization and generating a cropped field of view. The neutral networks may also include a second trained neural network (e.g., scan plane network referred to as ScanPlaneNet) for segmentation with cropped field of view. In certain embodiments, the techniques disclosed herein may occur on a separate computing device having processing circuitry and memory circuitry.

A processing component (e.g., a microprocessor or processing circuitry) and a memory of the magnetic resonance imaging system 100, such as may be present in scanner control circuitry 104 and/or system control circuitry 106, may be used to execute stored software code, instructions, or routines for acquiring and processing the MR data. The term “code” or “software code” used herein refers to any instructions or set of instructions that control the magnetic resonance imaging system 100. The code or software code may exist in a computer-executable form, such as machine code, which is the set of instructions and data directly executed by the processing component of the scanner control circuitry 104 and/or system control circuitry 106, human-understandable form, such as source code, which may be compiled in order to be executed by the processing component of the scanner control circuitry 104 and/or system control circuitry 106, or an intermediate form, such as object code, which is produced by a compiler. In some embodiments, the magnetic resonance imaging system 100 may include a plurality of controllers.

As an example, the memory may store processor-executable software code or instructions (e.g., firmware or software), which are tangibly stored on a non-transitory computer readable medium. Additionally or alternatively, the memory may store data. As an example, the memory may include a volatile memory, such as random-access memory (RAM), and/or a nonvolatile memory, such as read-only memory (ROM), flash memory, a hard drive, or any other suitable optical, magnetic, or solid-state storage medium, or a combination thereof. Furthermore, processing component may include multiple microprocessors, one or more “general-purpose” microprocessors, one or more special-purpose microprocessors, and/or one or more application specific integrated circuits (ASICS), or some combination thereof. For example, the processing component may include one or more reduced instruction set (RISC) or complex instruction set (CISC) processors. The processing component may include multiple processors, and/or the memory may include multiple memory devices.

In certain embodiments (e.g., for shoulder lesion measurement), the processing component is configured to obtain three-dimensional (3D) medical imaging data of a shoulder of a subject. The processing component is configured to utilize a first trained neural network to localize a glenohumeral joint in the 3D medical imaging data of the shoulder to a localized view utilizing cylinder segmentation. The processing component is configured to utilize a second trained neural network to detect a plane containing a circle encompassing a glenoid within the localized view, to utilize circle/ring segmentation to predict a ring segmentation mask from the localized view, and to predict a glenoid surface segmentation mask from the localized view. The processing component is configured to a defect algorithm to calculate an inferior glenoid diameter, a width of a bone lesion, and a glenoid track width based on the ring segmentation mask and the glenoid surface segmentation mask.

In certain embodiments, the processing component may be configured to output on a display an image of the glenoid from the 3D medical imaging data of the shoulder with a first segmentation ring mask representing the inferior glenoid diameter and a second segmentation ring mask representing the width of the bone lesion both overlayed on the glenoid. In certain embodiments, the processing component may be configured to output the inferior glenoid diameter, the width of a bone lesion, and the glenoid track width that were calculated.

In certain embodiments, the processing component may be configured when utilizing the first trained neural network to localize the glenohumeral joint to predict a glenoid surface segmentation mask and to predict a cylinder segmentation mask having a cylindrical shape that encompasses the glenoid surface segmentation mask. In certain embodiments, the processing component may be configured to utilize the cylinder segmentation mask to crop the 3D medical imaging data of the shoulder to generate the localized view. In certain embodiments, the processing component may be configured to normalize and augment the 3D medical imaging data of the shoulder prior to cropping the 3D medical imaging data of the shoulder to generate the localized view.

In certain embodiments, the processing component may be configured to normalize and augment the 3D medical imaging data of the shoulder prior to utilizing the first trained neural network to localize the glenohumeral joint in the 3D medical imaging data of the shoulder. In certain embodiments, the processing component may be configured to utilize the defect algorithm to calculate the inferior glenoid diameter, the width of the bone lesion, and the glenoid track width by fitting a plane derived from the ring segmentation mask, calculating a contour of the glenoid based on projections of the glenoid surface segmentation mask onto the plane, parametrizing the ring mask to determine the ring center and diameter, and measuring the width of the bone lesion by finding the lowest distance between glenoid contour and ring center to use as radius. In certain embodiments, the 3D medical imaging data is magnetic resonance imaging data acquired utilizing an oZTEo sequence. In certain embodiments, the 3D medical imaging data is computed tomography imaging data.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 3:
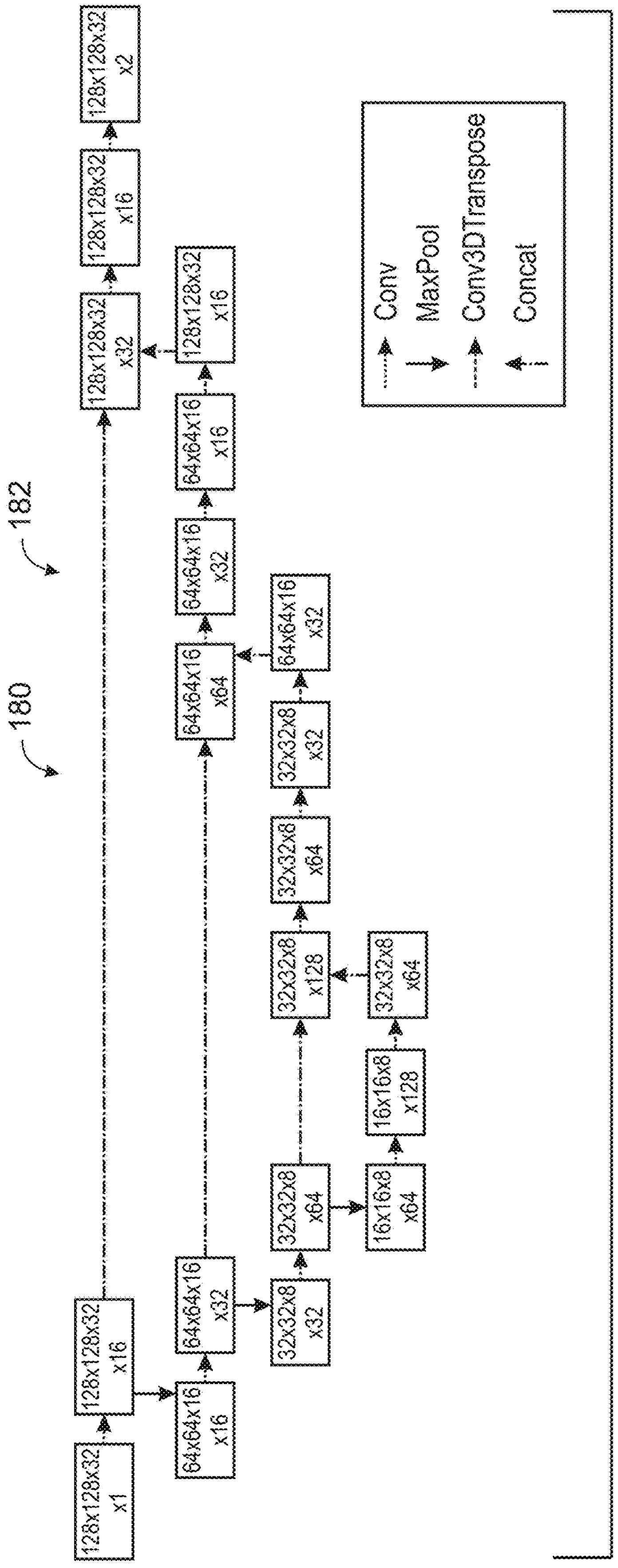
FIG. 3 illustrates a structure of a first trained neural network (e.g., coverage network) utilized by the disclosed techniques, in accordance with aspects of the present disclosure.

FIG. 3 illustrates a structure of a first trained neural network 180 (e.g., coverage network) utilized by the disclosed techniques. The first trained neural network 180 utilizes a convolutional neural network (CNN) based U-Net architecture 182. Input data into the first trained neural network 180 is 3D medical imaging data (e.g., 3D oZTEo image digital imaging and communications in medicine (DICOM) data). The 3D medical imaging data may be a 3D medical imaging volume or a stack of 2D medical images from a 3D volume acquisition. Prior to being inputted into the first trained neural network 180, the input data may be normalized and/or augmented. Normalization may include resizing to a coarser pixel size of 1.5×1.5×1.5 millimeters $(mm)^3$, z-score normalization, and/or conversion of DICOM to neuroimaging informatics technology initiative (NIfTI) format. Augmentation may include smoothing (e.g., [0.4, 1.7 mm] in plane, 1.5 mm slice), slice coverage, 3D rotation [−45, 45] to simulate patient anatomy and position positioning differences, bias field, noise, intensity, scaling, and/or orientation (e.g., coronal, sagittal).

The first trained neural network 180 was trained with a batch size of 16, a learning rate of 0.0001, and with loss function (e.g., smooth Dice loss). The first trained neural network 180 is trained to identify the gross imaging field-of-view (i.e., center field of view and the extent) for the relevant anatomy (e.g., glenohumeral joint). In particular, the first trained neural network 180 is trained to localize a glenohumeral joint in the 3D medical imaging data of the shoulder to a localized view utilizing cylinder segmentation (i.e., the localized view is cylinder-determined localized view). The first trained neural network 180 predicts and outputs a glenoid surface segmentation mask (e.g., 3D glenoid surface segmentation mask). The first trained neural network 180 also predicts and outputs a cylinder segmentation mask that has a cylindrical shape (e.g., forming the localized view) that encompasses the glenoid segmentation surface segmentation mask.

Figure 4:
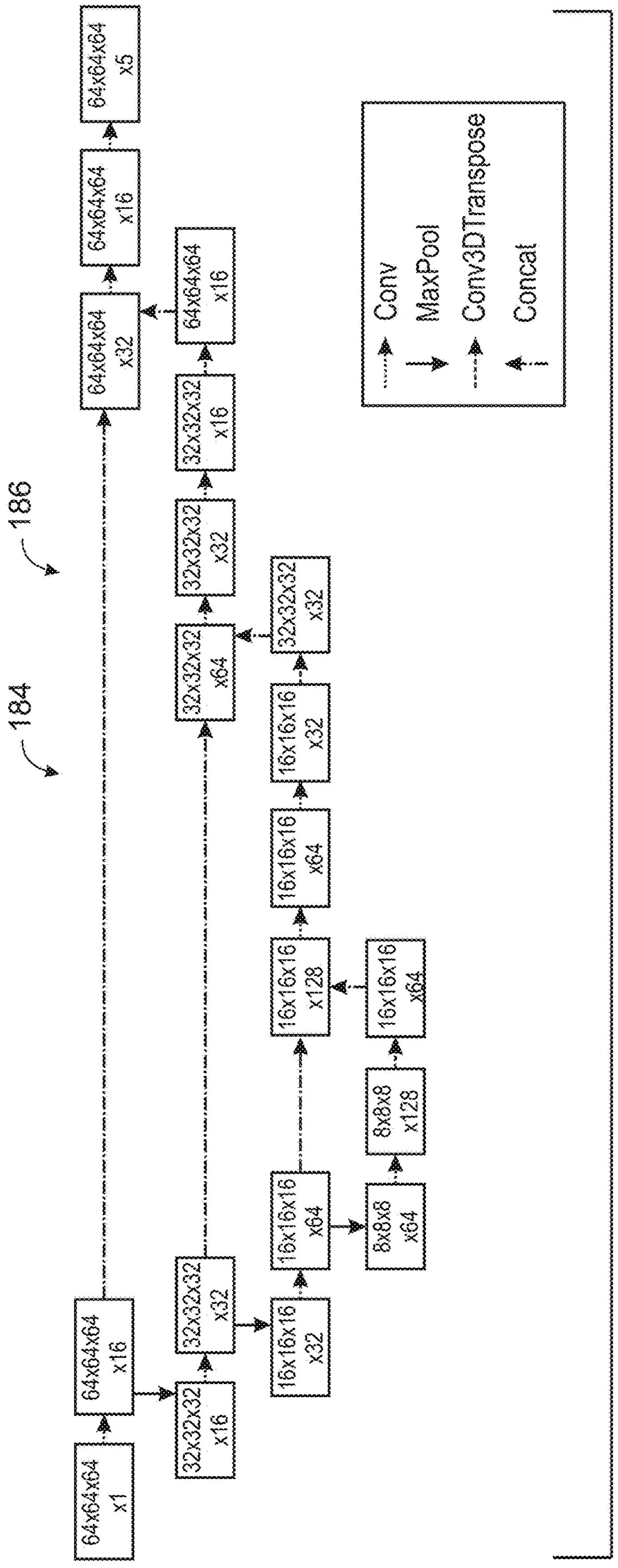
FIG. 4 illustrates a structure of a second trained neural network (e.g., scan plane network) utilized by the disclosed techniques, in accordance with aspects of the present disclosure.

FIG. 4 illustrates a structure of a second trained neural network 184 (e.g., scan plane network) utilized by the disclosed techniques. The second trained neural network 184 utilizes a convolutional neural network (CNN) based U-Net architecture 186. Input data into the second trained neural network 184 is based on the 3D medical imaging data (e.g., 3D oZTEo image DICOM data) that was inputted into the first trained neural network 180 in FIG. 3 and the cylinder segmentation mask generated by the first trained neural network 180. In particular, the cylinder segmentation mask is utilized to crop the 3D medical imaging data being inputted to a cylinder-determined localized view to generate a cropped image. Prior to being inputted into the second trained neural network 184, the input data (i.e., cropped image) may be normalized and/or augmented. Normalization may include resizing to a smaller pixel size of 0.667×0.667×0.667 $mm^3$, reslicing to the orientation of the patient axes, z-score normalization, and/or conversion of DICOM to NIfTI format. Augmentation may include smoothing (e.g., [0.4, 1.7 mm] in plane, 1.0 mm slice), 3D rotation [−45, 45], 3D translation, bias field, noise, intensity, left/right flip, and/or orientation (e.g., coronal, sagittal).

The second trained neural network 184 was trained with a batch size of 16, a learning rate of 0.0001, and with loss function (e.g., distance-weighted Dice loss) as explained in greater detail below. The second trained neural network 184 is trained for 3D data to determine one or more image scan planes or image scan plane parameters. In particular, the second trained neural network 184 is trained to detect a plane containing a circle encompassing a glenoid within the localized view, to utilize circle/ring segmentation to predict a ring segmentation mask from the localized view, and to predict a glenoid surface segmentation mask from the localized view (i.e., find the glenoid surface with the cylinder-determined localized view). The input size into the second trained neural network 184 is smaller than with the first trained neural network 180. Also, more segmentations are predicted at the output of the second trained neural network 184 than with the first trained neural network 180.

Figure 5:
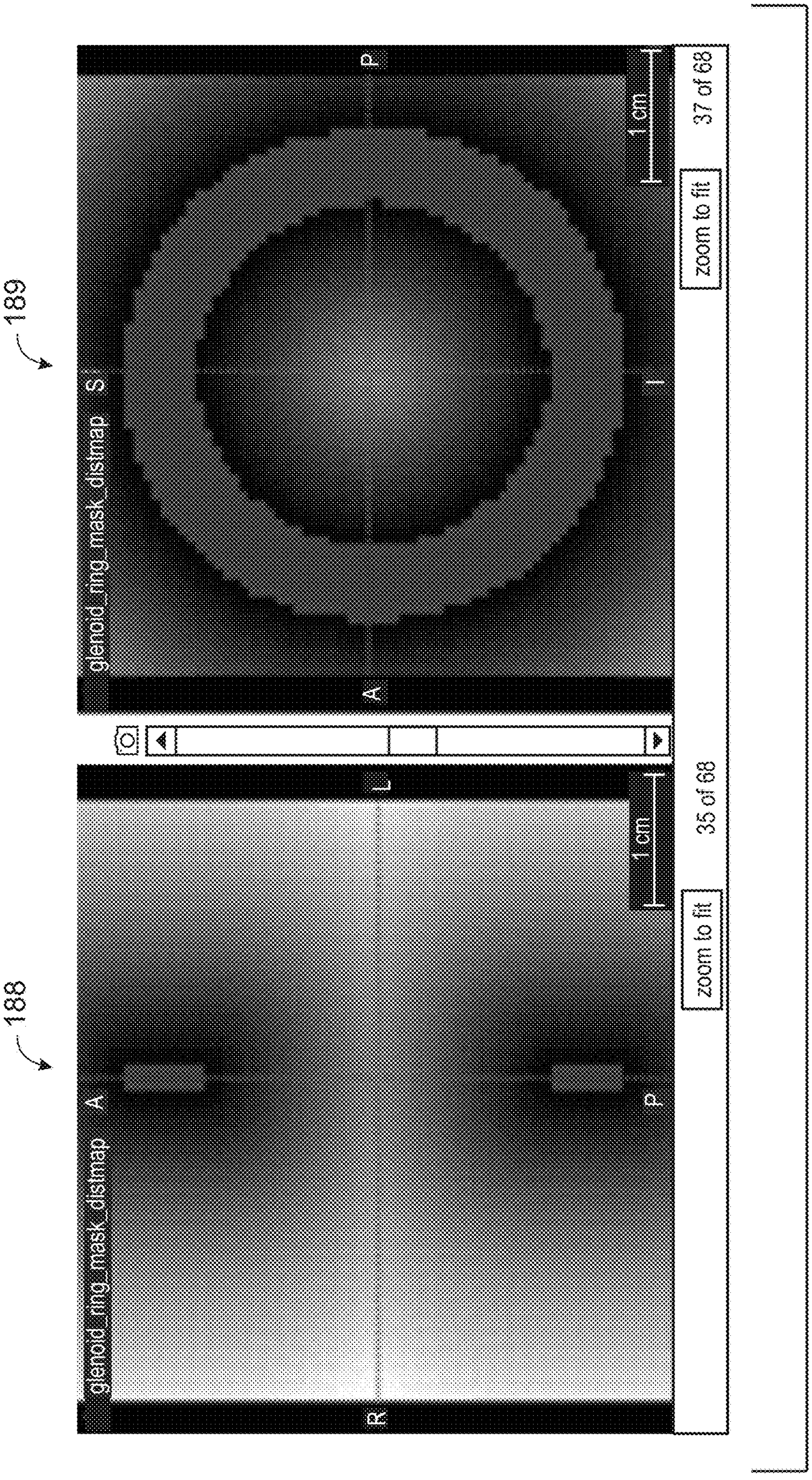
FIG. 5 depicts a distance map for a ring-shaped mask, in accordance with aspects of the present disclosure.

The loss function of the second trained neural network 184 is a combination of Dice coefficient and boundary distance loss (i.e., distance weighted Dice loss) that aids with learning a thin target ring. The distance and Dice loss hold weights (e.g., $\alpha_1$=0.5, $\alpha_2$=0.3, respectively) until the distance loss term is negative, at which point the weights are set (e.g., $\alpha_1$=0.1, $\alpha_2$=0.3, respectively). In certain embodiments, the hyperparameters may be further refined along with the augmentation/normalization strategy. FIG. 5 depicts an example of a distance map for a ring-shaped mask. Image 188 on the left of FIG. 5 is a side cross-section view of the distance map for the ring-shaped mask. Image 189 on the right of FIG. 5 is a front view of the distance map for the ring-shaped mask (i.e., ring segmentation mask). A distance-weighted loss function, L, for the second trained neural network 184 is:

$$L = \alpha_1 \tanh(\text{mean}(y_{pred} * m)) + \alpha_2 L_{Dice} \quad (2)$$

where m represents distance map and $y_{pred}$ represents predicted mask.

Figure 6:
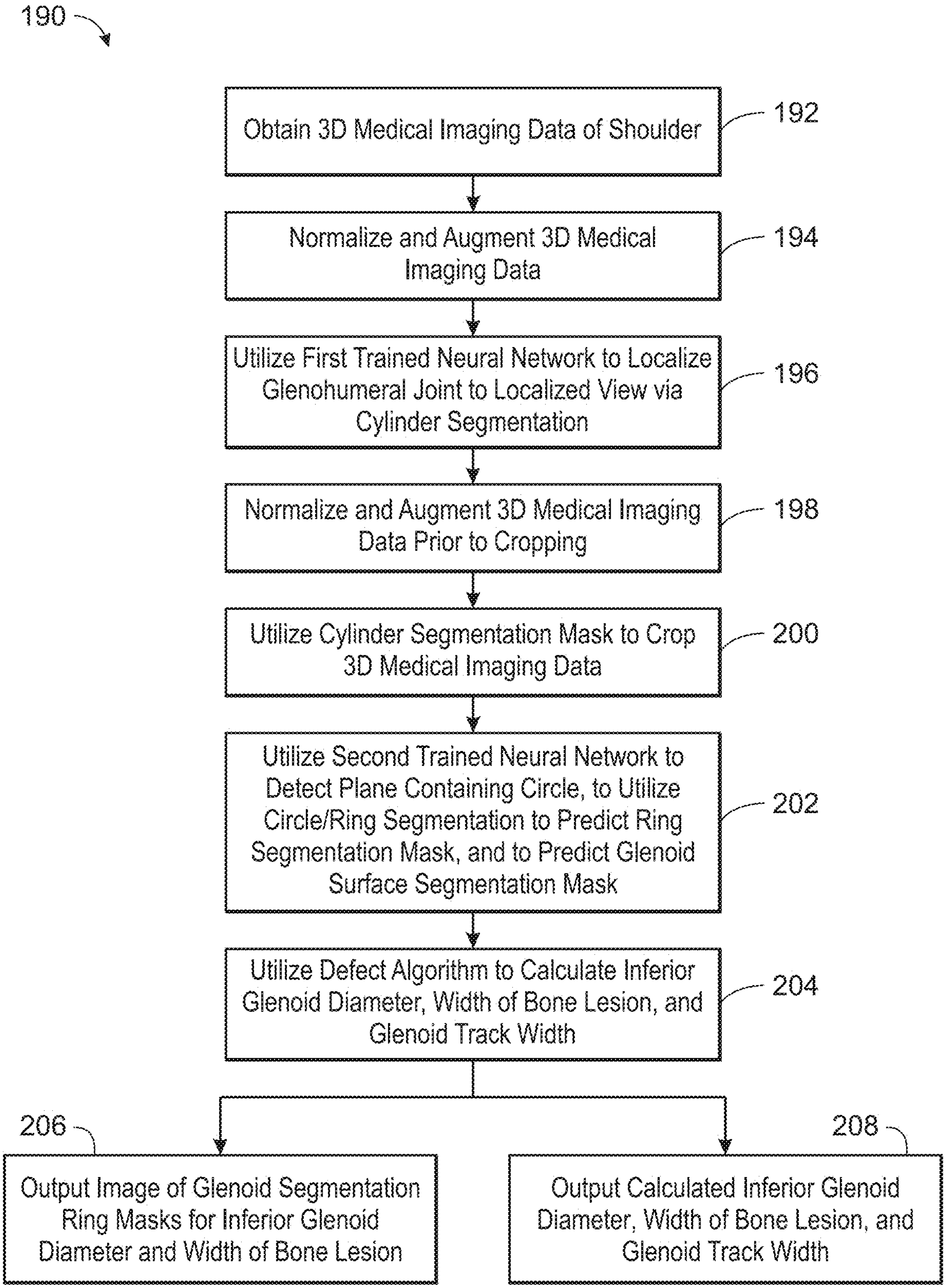
FIG. 6 illustrates a flow diagram of a method for shoulder lesion measurement, in accordance with aspects of the present disclosure.

FIG. 6 illustrates a flow diagram of a method 190 for shoulder lesion measurement. One or more steps of the method 190 may be performed by processing circuitry of the magnetic resonance imaging system 100 in FIG. 1 or a remote computing device.

The method 190 includes obtaining 3D medical imaging data of a shoulder of a subject (block 192). In certain embodiments, the 3D medical imaging data is magnetic resonance imaging data acquired utilizing an oZTEo sequence. In certain embodiments, the 3D medical imaging data is computed tomography imaging data. In certain embodiments, the method 190 includes normalizing and augmenting the 3D medical imaging data of the shoulder prior to entering the 3D medical imaging data into the first trained neural network (coverage network) (block 194). The method 190 further includes utilizing the first trained neural network to localize a glenohumeral joint in the 3D medical imaging data of the shoulder to a localized view utilizing cylinder segmentation (block 196). Utilizing the first trained neural network to localize the glenohumeral joint includes predicting a glenoid surface segmentation mask and predicting a cylinder segmentation mask (which forms the cylinder-determined localized view) having a cylindrical shape that encompasses the glenoid surface segmentation mask.

In certain embodiments, the method 190 includes normalizing and augmenting the 3D medical imaging data of the shoulder prior to cropping the 3D medical imaging data of the shoulder (utilizing the cylinder segmentation mask) to generate the localized view (block 198). The method 190 includes utilizing, via the processing system, the cylinder segmentation mask to crop the 3D medical imaging data of the shoulder to generate the localized view (block 200). The method 190 also includes utilizing a second trained neural network (scan plane network) to detect a plane containing a circle (e.g., best fit circle) encompassing a glenoid within the localized view, to utilize circle/ring segmentation to predict a ring segmentation mask from the localized view, and to predict a glenoid surface segmentation mask from the localized view (block 202).

The method 190 further includes utilizing a defect algorithm to calculate an inferior glenoid diameter, a width of a bone lesion, and a glenoid track width based on the ring segmentation mask and the glenoid surface segmentation mask (block 204). The method 190 utilizes the defect algorithm to calculate the inferior glenoid diameter, the width of the bone lesion, and the glenoid track width by fitting a plane derived from the ring segmentation mask, calculating a contour of the glenoid based on projections of the glenoid surface segmentation mask onto the plane, parametrizing the ring mask to determine the ring center and diameter, and measuring the width of the bone lesion by finding the lowest distance between glenoid contour and ring center to use as radius. In certain embodiments, the method 190 includes outputting, on a display, an image of the glenoid from the 3D medical imaging data of the shoulder with a first segmentation ring mask representing the inferior glenoid diameter and a second segmentation ring mask representing the width of the bone lesion both overlayed on the glenoid (block 206). In certain embodiments, the method 190 includes outputting (e.g., on a display) the inferior glenoid diameter, the width of a bone lesion, and the glenoid track width that were calculated (block 208). A clinician may choose to take these metrics and the segmentations as provided. Alternatively, the clinician may update or revise or annotate the provided information.

Figure 7:
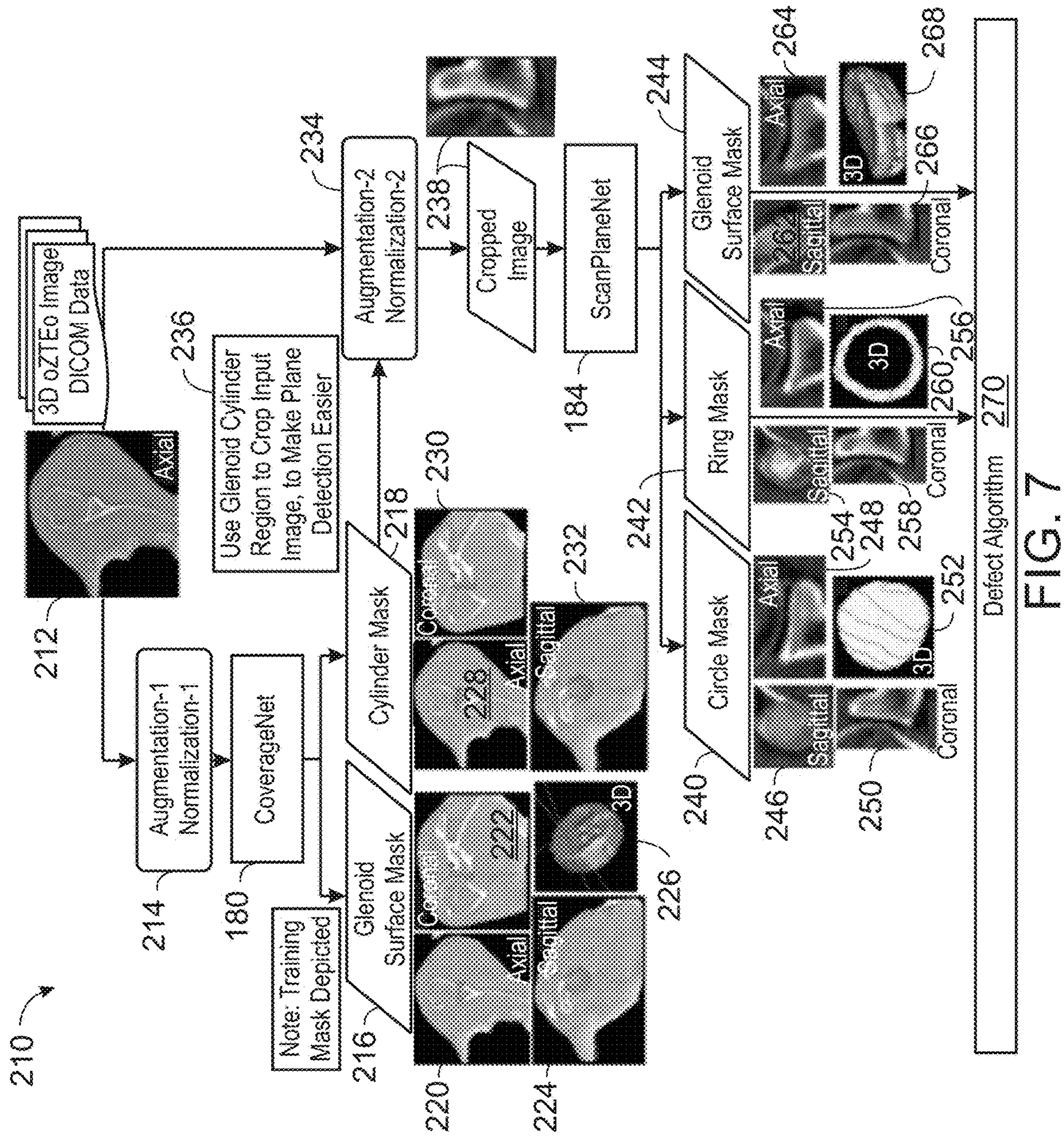
FIG. 7 illustrates a schematic diagram of a process for shoulder lesion measurement, in accordance with aspects of the present disclosure.

FIG. 7 illustrates a schematic diagram of a process 210 for shoulder lesion measurement. The process 210 includes obtaining 3D medical imaging data 212 of a shoulder of a subject. As depicted, the 3D medical imaging data is magnetic resonance imaging data acquired utilizing an oZTEo sequence. The process 210 includes normalizing and augmenting the 3D medical imaging data 212 of the shoulder (as discussed with reference to FIG. 3) as indicated by reference numeral 214. After normalization and augmentation, the 3D medical imaging data 212 is input into a coverage network 180 (referred to as CoverageNet). The coverage network 180 outputs (and predicts) a glenoid surface segmentation mask 216 and a cylinder segmentation mask 218. The cylinder segmentation mask 218 encompasses the glenoid surface segmentation mask 216. Images 220, 222, 224, and 226 represent an axial view, a coronal view, a sagittal view, and an oblique view with 3D rendering, respectively, of the glenoid surface segmentation mask 216. Images 228, 230, and 232 represent an axial view, a coronal view, and a sagittal view, respectively, of the cylinder segmentation mask 218.

The process 210 includes normalizing and augmenting the 3D medical imaging data 212 of the shoulder (as discussed with reference to FIG. 4) as indicated by reference numeral 234. After normalization and augmentation, the 3D medical imaging data 212 is cropped utilizing the cylinder segmentation mask 218 (as indicated by reference numeral 236) to generate a cylinder-determined localized view (i.e., cropped image 238). The cropped image 238 is input into the scan plane network 184 (referred to as the ScanPlaneNet). The scan plane network 184 outputs (and predicts) a circle segmentation mask 240, a ring segmentation mask 242, and a glenoid surface segmentation mask 244. Images 246, 248, 250, and 252 represent a sagittal view, an axial view, a coronal view, and an oblique view with 3D rendering, respectively, of the circle segmentation mask 240. Images 254, 256, 258, and 260 represent a sagittal view, an axial view, a coronal view, and an oblique view with 3D rendering, respectively, of the ring segmentation mask 242. Images 262, 264, 266, and 268 represent a sagittal view, an axial view, a coronal view, and an oblique view with 3D rendering, respectively, of the glenoid surface segmentation mask 244. The ring segmentation mask 242 and the glenoid surface segmentation mask 244 are inputted into a defect algorithm 270 that calculates an inferior glenoid diameter, a width of a bone lesion, and a glenoid track width.

Figure 8:
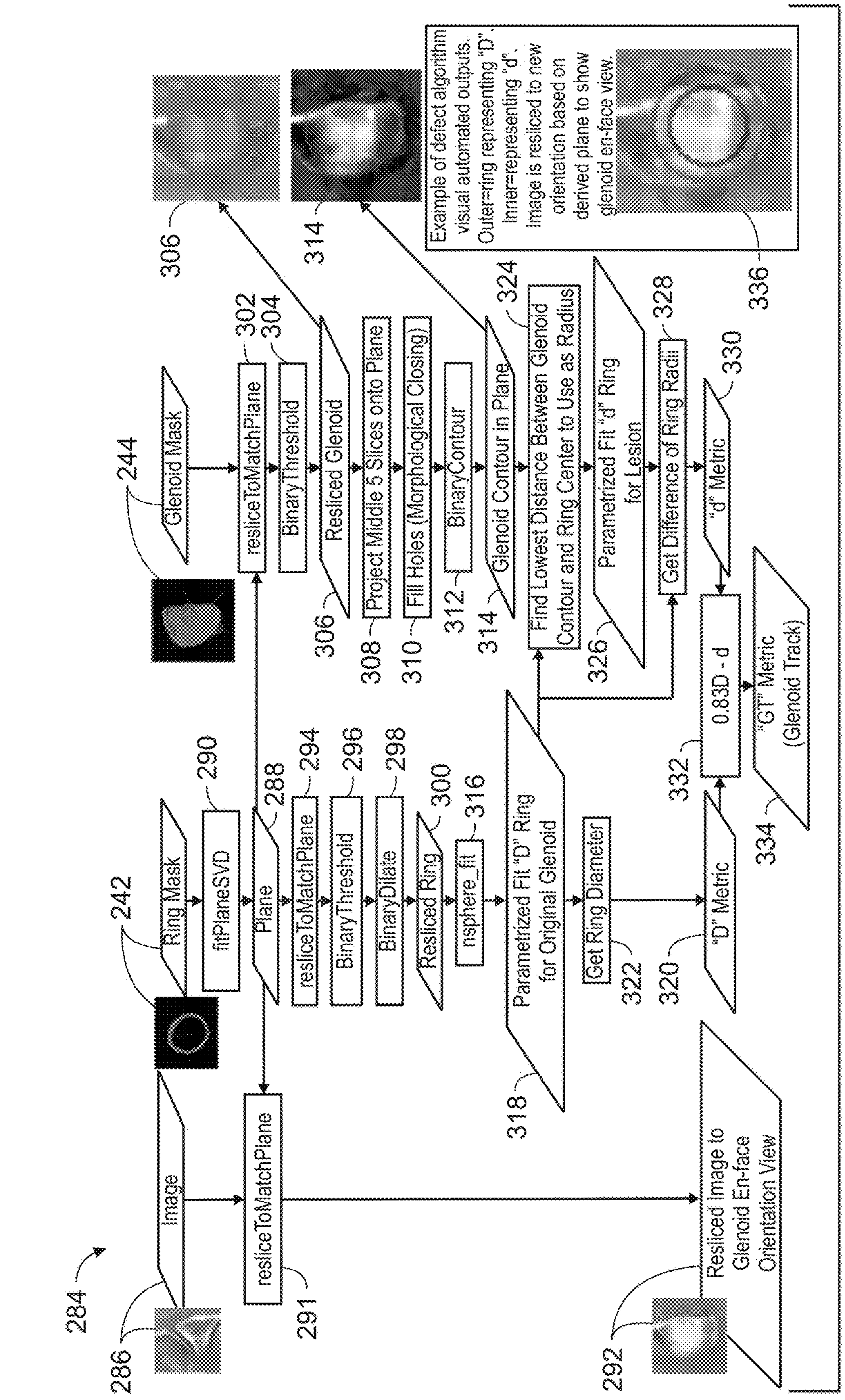
FIG. 8 illustrates a schematic diagram of a process for utilizing the defect algorithm, in accordance with aspects of the present disclosure.

FIG. 8 illustrates a schematic diagram of a process 284 for utilizing the defect algorithm. An image 286 from the 3D medical imaging of the shoulder, the ring segmentation mask 242, and the glenoid surface segmentation mask 244 into the defect algorithm. The process 284 includes utilizing singular value decomposition (SVD) to fit a plane 288 to the ring segmentation mask 242 as indicated by reference numeral 290. Then, the process 284 includes reslicing the 3D medical imaging data (as indicated by reference numeral 291) to obtain a resliced image 292 that matches the plane 288. The resliced image 292 is oriented to a glenoid en-face orientation view. The process 284 also includes reslicing the ring segmentation mask 242 (as indicated by reference numeral 294) to match the plane 288, performing binary thresholding (as indicated by reference numeral 296), and performing binary dilation (as indicated by reference numeral 298) to obtain a resliced ring segmentation mask 300. The process 284 further includes reslicing the glenoid surface segmentation mask 244 (as indicated by the reference numeral 302) and performing binary thresholding (as indicated by reference numeral 304) to obtain a resliced glenoid surface segmentation mask 306.

The process 284 utilizes the resliced glenoid surface segmentation mask 306 to project the middle five slices onto a plane (as indicated by reference numeral 308), fills holes (e.g., via morphological closing) (as indicated by reference numeral 310), and performs binary contouring (as indicated by reference numeral 312) to obtain a glenoid contour 314 in plane. The process 284 also performs fitting an n-sphere (indicated by reference numeral 316) utilizing the resliced ring segmentation mask 300 to obtain a parameterized fit "D" ring 318 for the original glenoid. The process 284 includes getting or determining the ring diameter 320 (i.e., the inferior glenoid diameter or "D" metric) (as indicated by reference numeral 322) from the parameterized fit "D" ring 318.

The process 284 utilizing the parameterized fit "D" ring 318 and the glenoid contour 314 to find the lowest distance between the glenoid contour 314 and a ring center of the parameterized fit "D" ring 318 to utilize as a radius (as indicated by reference numeral 324), which is utilized to obtain a parameterized fit "d" ring 326 for lesion. The process 284 includes determining the difference in radii between the parameterized fit "D" ring 318 and the parameterized fit "d" ring 326 (as indicated by reference numeral 328) to obtain the width of the bone lesion (anterior glenoid bone loss width) or "d" metric 330. Both the inferior glenoid diameter 320 and the width of the bone lesion 330 are inputted into equation (1) above (and shown by reference numeral 332) to calculate the glenoid track width (GT) 334. Besides outputting the metrics, the process 284 includes automatically outputting an image 336 (derived from the resliced image 292 oriented to a glenoid en-face orientation view) with the parameterized fit "D" ring 318 (e.g., first segmentation mask ring) and the parameterized fit "d" ring 326 (e.g., second segmentation mask ring) overlayed on the glenoid.

FIG. 9 depicts a table 338 summarizing quantitative results of a comparison of the disclosed techniques (i.e., artificial intelligence-based approach model for shoulder lesion measurement as described with respect to FIGS. 6-8) to ground truths. Image data utilized for the comparison is 3D MRI data of shoulders of subjects obtained utilizing an oZTEo sequence. The ground truths were derived from annotations by clinicians. A first column 338 of the table 336 represents the case number. A second column 340 of the table 338 represents the dice score of comparing the predicted segmentation ring mask to the ground truth segmentation ring mask. A third column 342 of the table 338 represents the Dice score of comparing the predicted glenoid surface segmentation mask to the ground truth glenoid surface segmentation mask. A fourth column 344 of the table 338 represents the ground truth value of D (i.e., inferior glenoid diameter). A fifth column 346 of the table 338 represents the predicted value of D. A sixth column 348 of the table 338 represents the difference between the ground value and the predicted value of D. As depicted, the difference is minimal between the ground value and the predicted value of D. A seventh column 350 of the table 338 represents the ground truth value of d (i.e., width of bone lesion or anterior glenoid bone loss). An eighth column 352 of the table 338 represents the predicted value of d. A ninth column 354 of the table 338 represents the difference between the ground value and the predicted value of d. As depicted, the difference is minimal between the ground value and the predicted value of d.

Figure 10:
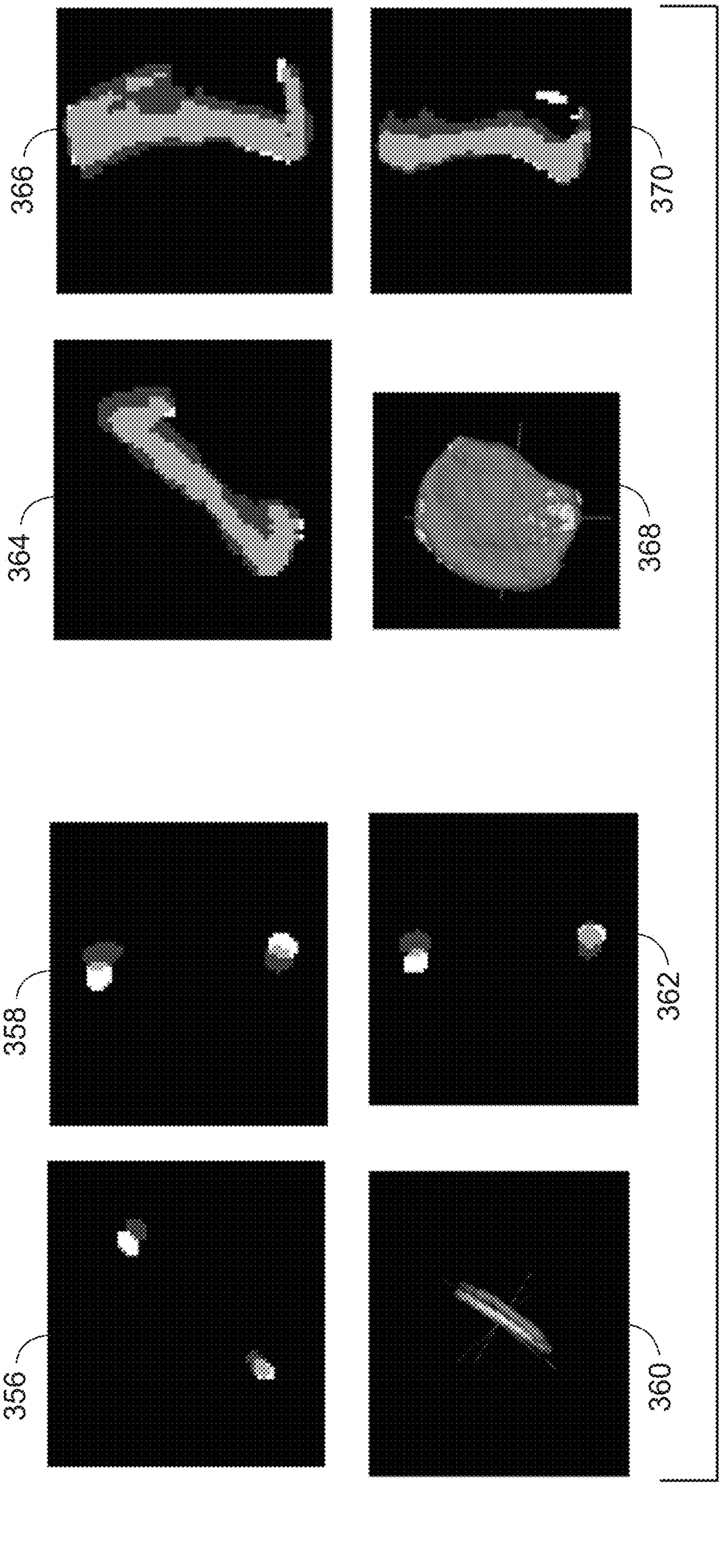
FIG. 10 depicts a first qualitative example of a comparison of segmentations utilizing the disclosed techniques to ground truth segmentations, in accordance with aspects of the present disclosure.
Figure 11:
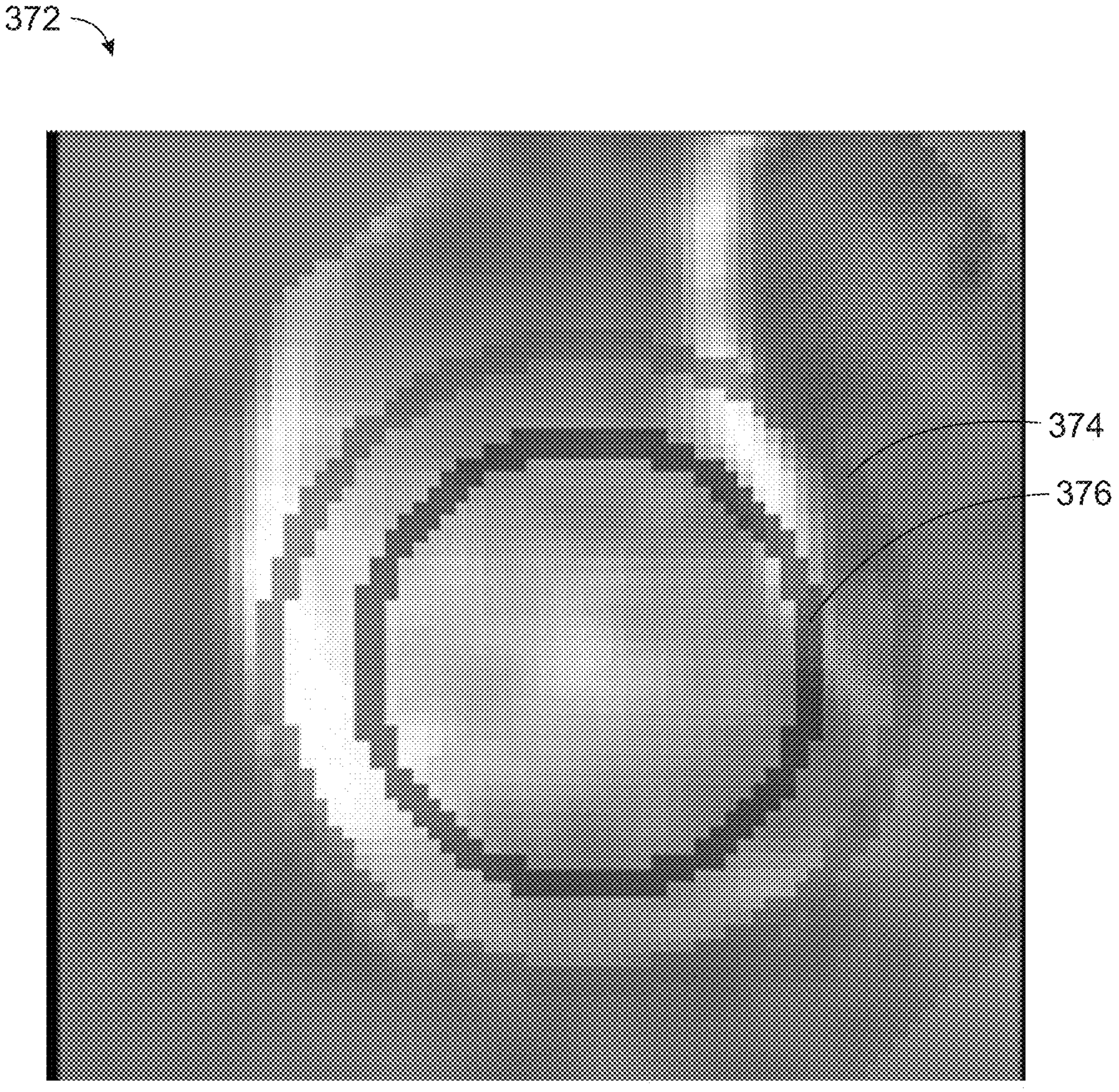
FIG. 11 depicts an outputted glenoid en-face view image with predicted rings derived from the segmentations utilizing the disclosed techniques in the first qualitative example, in accordance with aspects of the present disclosure.

FIG. 10 depicts a first example of a comparison of segmentations utilizing the disclosed techniques (i.e., artificial intelligence-based approach model for shoulder lesion measurement as described with respect to FIGS. 6-8) to ground truth segmentations. The segmentations for the ring target and the glenoid surface target. The first example is derived from the first (top) case in the table 338 in FIG. 9. Images 356, 358, 360, and 362 are combined images of the ground truth segmentation (white) and the predicted segmentation (gray) of the ring target overlaid with respect to each other. Images 356, 358, 360, and 362 are an axial view, sagittal view, oblique view with 3D renderings, and coronal view, respectively. Images 364, 366, 368, and 370 are combined images of the ground truth segmentation (white) and the predicted segmentation (gray) of the glenoid surface target overlaid with respect to each other. Images 364, 366, 368, and 370 are an axial view, sagittal view, oblique view with 3D renderings, and coronal view, respectively. FIG. 11 depicts an outputted glenoid en-face view image 372 with predicted rings 374 and 376 derived from the segmentations utilizing the disclosed techniques in the first example. The outer predicted ring 374 represents D (i.e., the inferior glenoid diameter). The inner predicted ring 376 represents the d (i.e., the width of the bone lesion or anterior glenoid bone loss width). As depicted in the image 372, the glenoid has been chipped.

Figure 12:
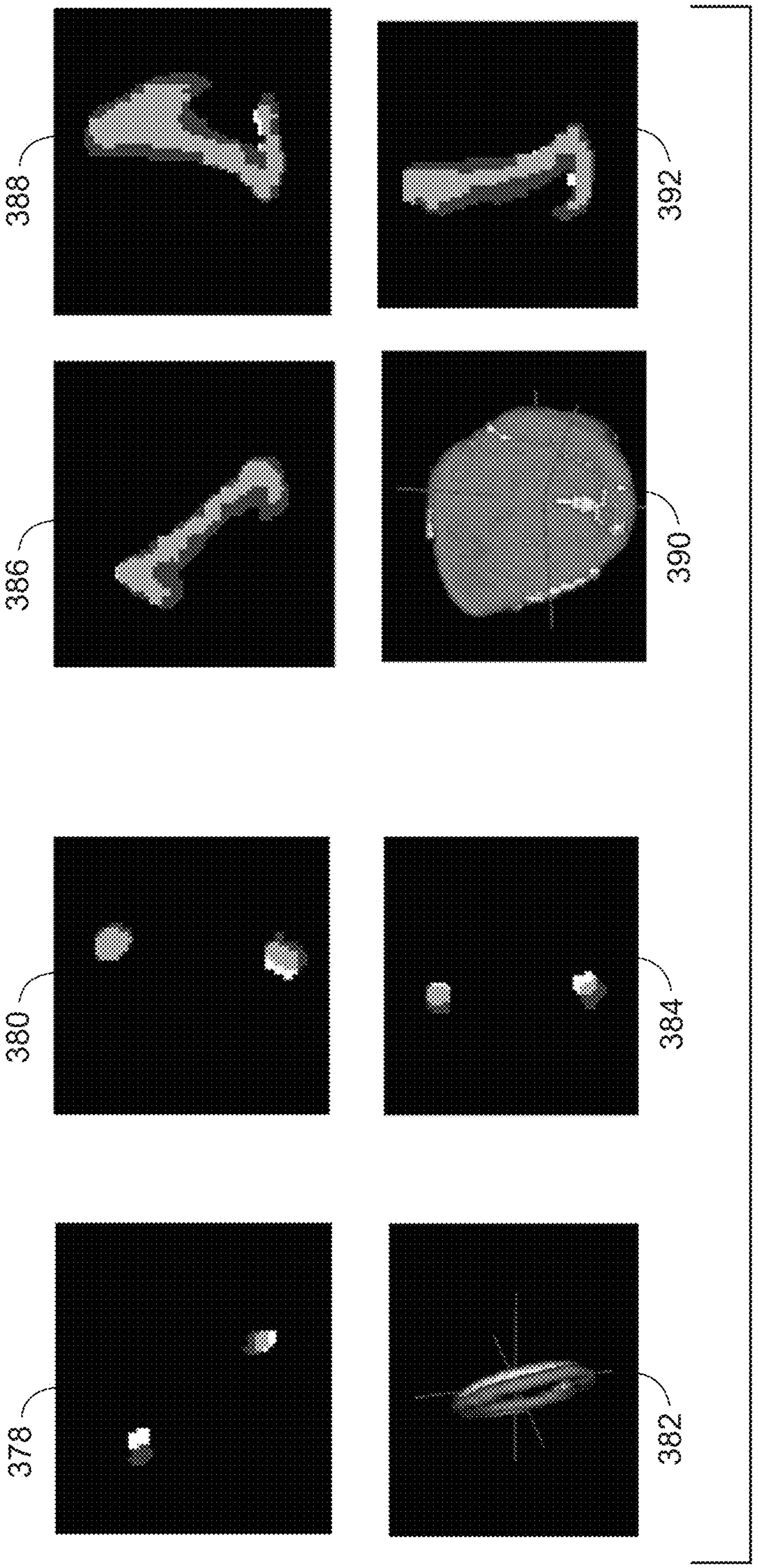
FIG. 12 depicts a second qualitative example of a comparison of segmentations utilizing the disclosed techniques to ground truth segmentations, in accordance with aspects of the present disclosure.
Figure 13:
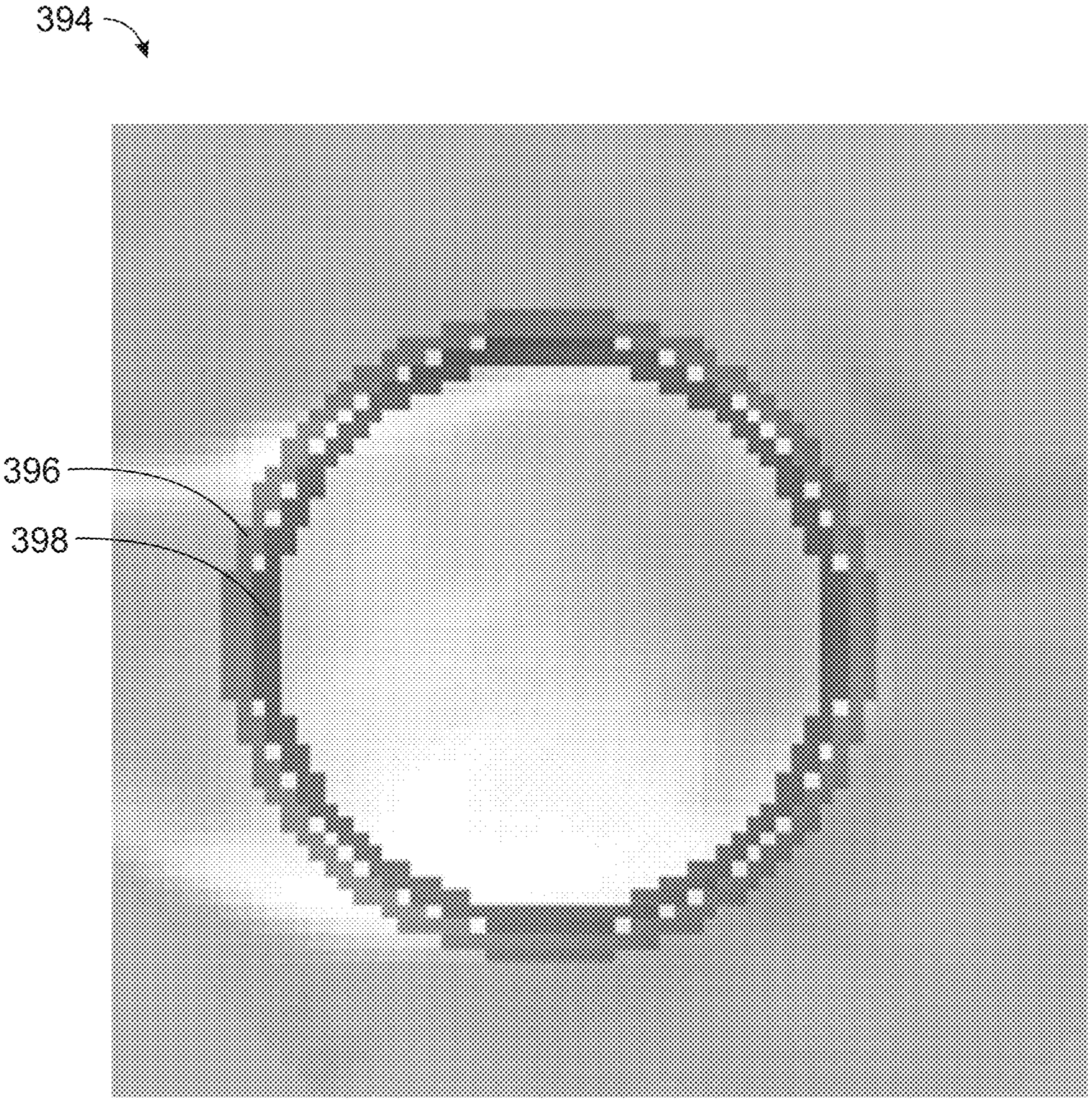
FIG. 13 depicts an outputted glenoid en-face view image with predicted rings derived from the segmentations utilizing the disclosed techniques in the second qualitative example, in accordance with aspects of the present disclosure.

FIG. 12 depicts a second example of a comparison of segmentations utilizing the disclosed techniques (i.e., artificial intelligence-based approach model for shoulder lesion measurement as described with respect to FIGS. 6-8) to ground truth segmentations. The segmentations for the ring target and the glenoid surface target. The second example is derived from the second case in the table 338 in FIG. 9. Images 378, 380, 382, and 384 are combined images of the ground truth segmentation (white) and the predicted segmentation (gray) of the ring target overlaid with respect to each other. Images 378, 380, 382, and 384 are an axial view, sagittal view, oblique view with 3D renderings, and coronal view, respectively. Images 386, 388, 390, and 392 are combined images of the ground truth segmentation (white) and the predicted segmentation (gray) of the glenoid surface target overlaid with respect to each other. Images 386, 388, 390, and 392 are an axial view, sagittal view, oblique view with 3D renderings, and coronal view, respectively. FIG. 13 depicts an outputted glenoid en-face view image 394 with predicted rings 396 and 398 derived from the segmentations utilizing the disclosed techniques in the second example. The outer predicted ring 396 represents D (i.e., the inferior glenoid diameter). The inner predicted ring 398 represents the d (i.e., the width of the bone lesion or anterior glenoid bone loss width). As depicted in the image 394, the glenoid is in much better shape (as indicated by the nearly overlapping predicted rings 396 and 398) than the glenoid in image 372 in FIG. 11.

Figure 14:
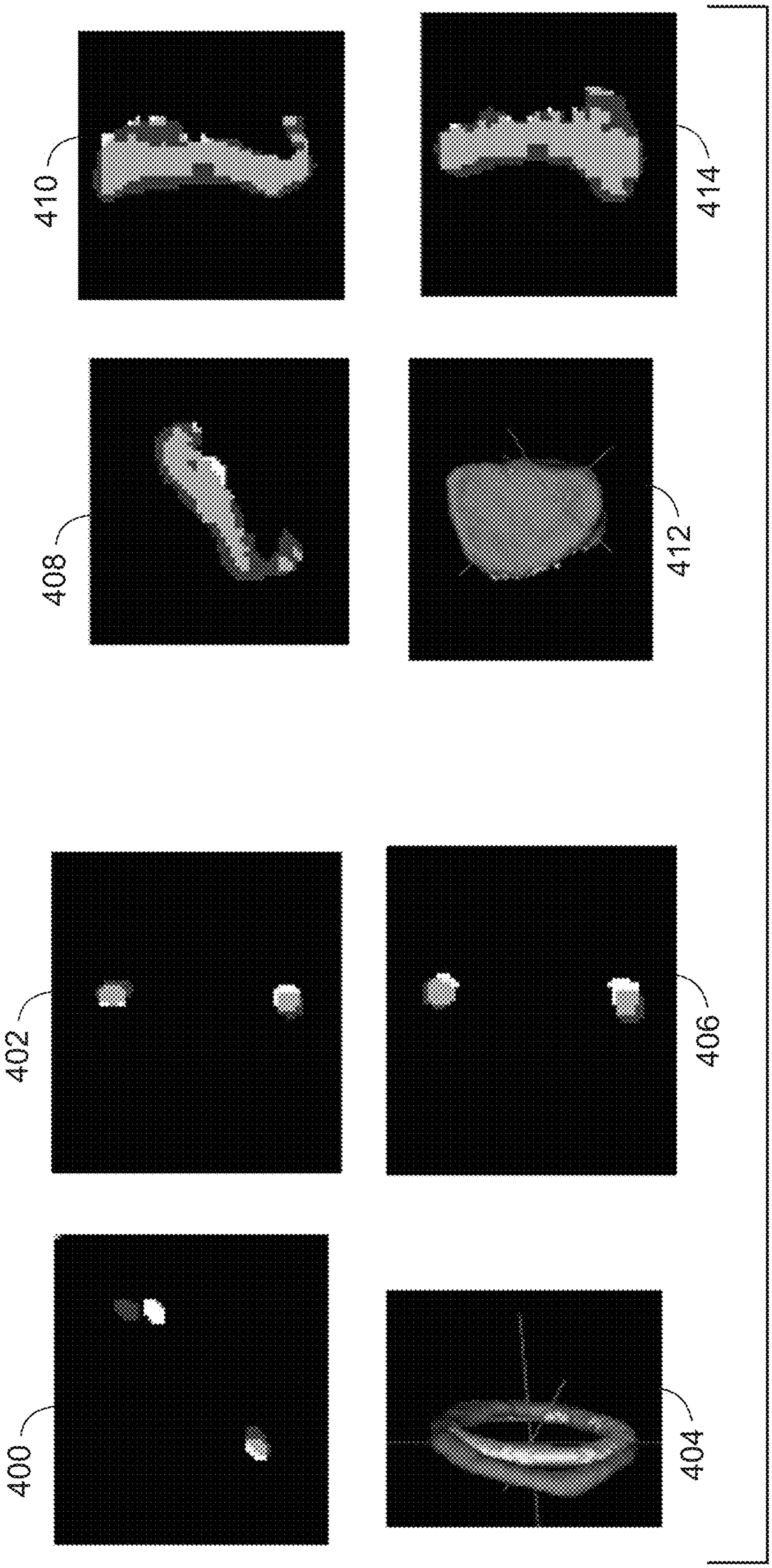
FIG. 14 depicts a third qualitative example of a comparison of segmentations utilizing the disclosed techniques to ground truth segmentations, in accordance with aspects of the present disclosure.
Figure 15:
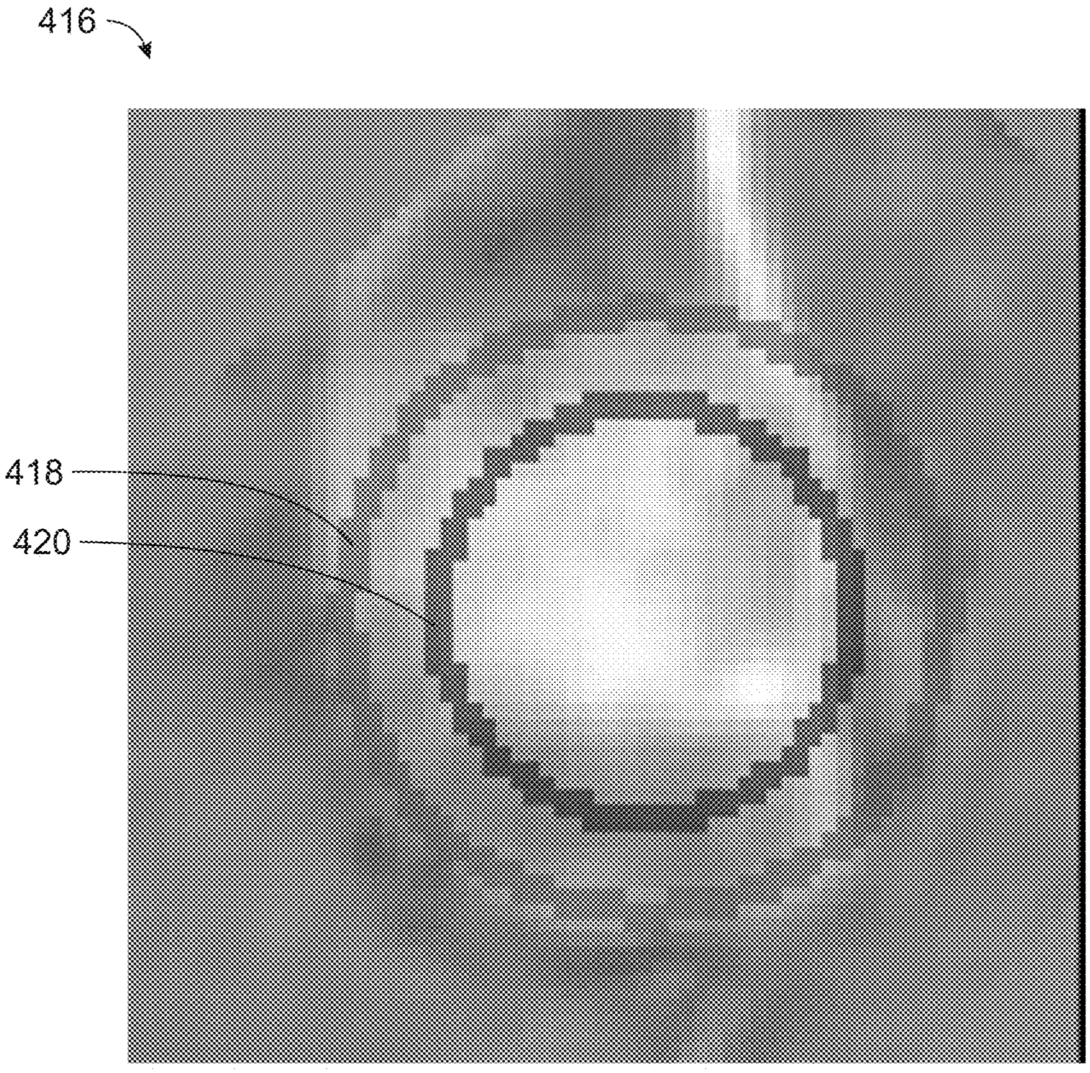
FIG. 15 depicts an outputted glenoid en-face view image with predicted rings derived from the segmentations utilizing the disclosed techniques in the third qualitative example, in accordance with aspects of the present disclosure.

FIG. 14 depicts a third example of a comparison of segmentations utilizing the disclosed techniques (i.e., artificial intelligence-based approach model for shoulder lesion measurement as described with respect to FIGS. 6-8) to ground truth segmentations. The segmentations for the ring target and the glenoid surface target. The third example is derived from the sixth (bottom) case in the table 338 in FIG. 9. Images 400, 402, 404, and 406 are combined images of the ground truth segmentation (white) and the predicted segmentation (gray) of the ring target overlaid with respect to each other. Images 400, 402, 404, and 406 are an axial view, sagittal view, oblique view with 3D renderings, and coronal view, respectively. Images 408, 410, 412, and 414 are combined images of the ground truth segmentation (white) and the predicted segmentation (gray) of the glenoid surface target overlaid with respect to each other. Images 408, 410, 412, and 414 are an axial view, sagittal view, oblique view with 3D renderings, and coronal view, respectively. FIG. 15 depicts an outputted glenoid en-face view image 416 with predicted rings 418 and 420 derived from the segmentations utilizing the disclosed techniques in the second example. The outer predicted ring 418 represents D (i.e., the inferior glenoid diameter). The inner predicted ring 420 represents the d (i.e., the width of the bone lesion or anterior glenoid bone loss width).

Figure 16:
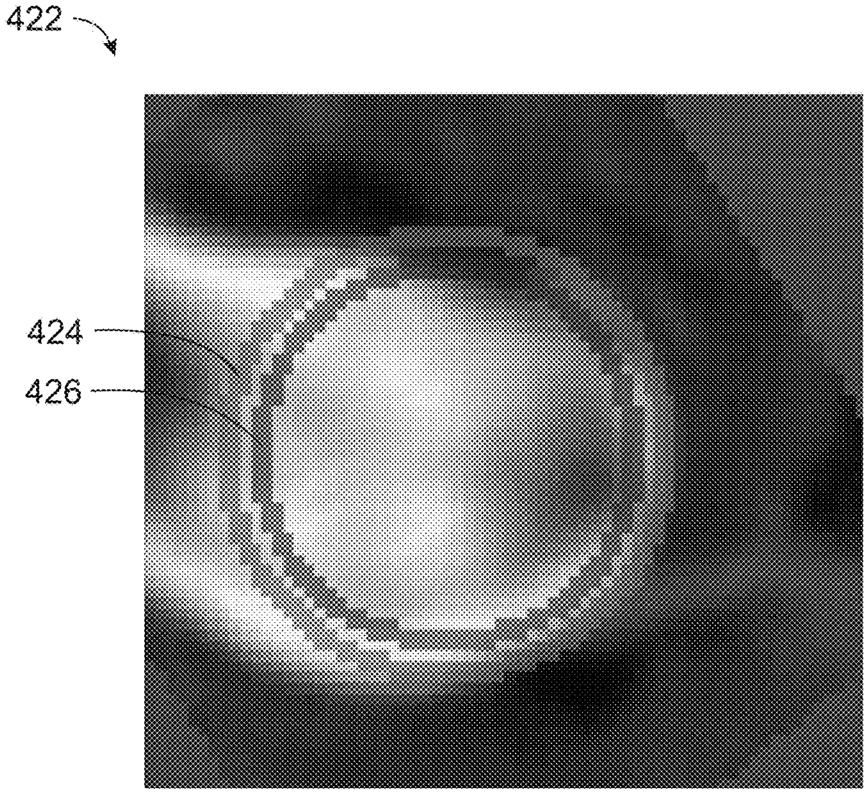
FIG. 16 depicts an outputted glenoid en-face view image with predicted rings derived from the segmentations utilizing the disclosed techniques.
Figure 17:
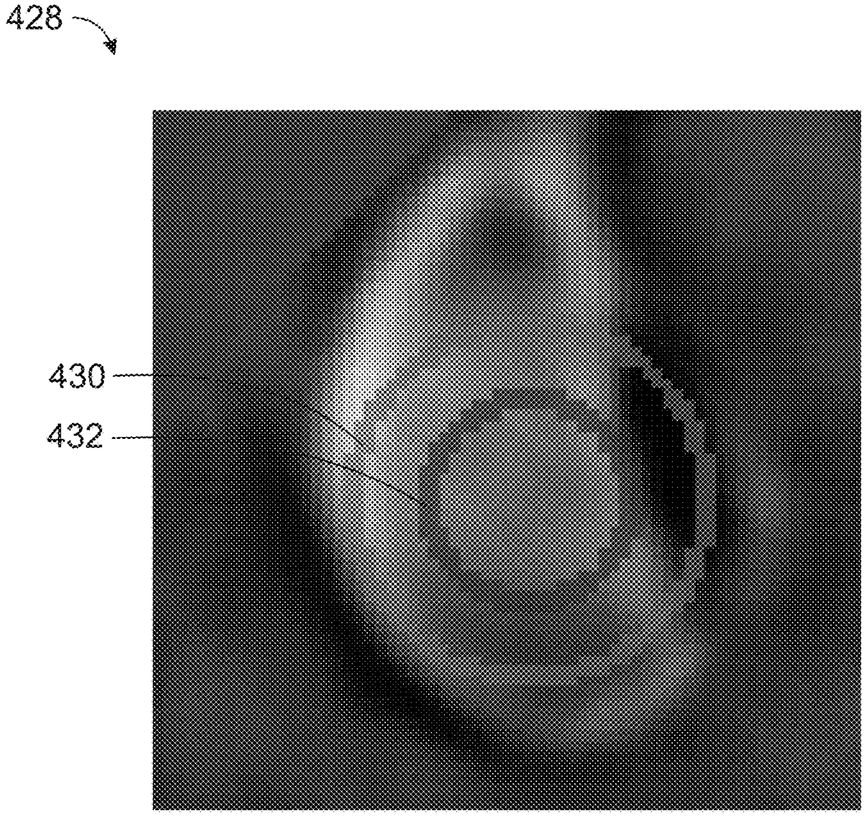
FIG. 17 depicts another outputted glenoid en-face view image with predicted rings derived from the segmentations utilizing the disclosed techniques.

FIG. 16 depicts an outputted glenoid en-face view image 422 with predicted rings 424 and 426 derived from the segmentations utilizing the disclosed techniques on 3D MRI data of a shoulder of a subject obtained utilizing an oZTEo sequence. The outer predicted ring 424 represents D (i.e., the inferior glenoid diameter). The inner predicted ring 426 represents the d (i.e., the width of the bone lesion or anterior glenoid bone loss width). FIG. 17 depicts an outputted glenoid en-face view image 428 with predicted rings 430 and 432 derived from the segmentations utilizing the disclosed techniques on 3D MRI data of a shoulder of another subject obtained utilizing an oZTEo sequence. The outer predicted ring 430 represents D (i.e., the inferior glenoid diameter). The inner predicted ring 432 represents the d (i.e., the width of the bone lesion or anterior glenoid bone loss width). The glenoid in image 422 in FIG. 17 is in much better shape (as indicated by the nearly overlapping predicted rings 424 and 426) than the glenoid in image 428 in FIG. 17.

Technical effects of the disclosed subject matter include providing systems and methods for shoulder lesion measurement. In particular, a deep learning-based pipeline is utilized to automate Bankart lesion measurements given a 3D medical imaging volume (MR imaging volume acquired with an osteo specific sequence such as oZTEo) in order to improve the shoulder instability surgical diagnosis workflow. Technical effects of the disclosed subject matter include utilizing an artificial intelligence-based approach model for glenoid defect measurement. Technical effects of the disclosed subject matter include providing an approach that is more generalizable to handle acquisition changes by offering geometric standardization. In addition, technical effects of the disclosed subject matter include providing an approach that is explainable by replicating the final segmentation represented in a same manner that a clinician would use in their practice. Technical effects of the disclosed subject matter include providing an automatic diagnostic measurement process. Technical effects of the disclosed subject matter include reducing the workflow time for measuring relevant clinical metrics used for surgical diagnosis.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for shoulder lesion measurement, comprising:
   obtaining, via a processing system comprising one or more processors, three-dimensional (3D) medical imaging data of a shoulder of a subject;
   utilizing, via the processing system, a first trained neural network to localize a glenohumeral joint in the 3D medical imaging data of the shoulder to a localized view utilizing cylinder segmentation;
   utilizing, via the processing system, a second trained neural network to detect a plane containing a circle encompassing a glenoid within the localized view, to utilize circle/ring segmentation to predict a ring segmentation mask from the localized view, and to predict a glenoid surface segmentation mask from the localized view; and
   utilizing, via the processing system, a defect algorithm to calculate an inferior glenoid diameter, a width of a bone lesion, and a glenoid track width based on the ring segmentation mask and the glenoid surface segmentation mask.

2. The computer-implemented method of claim 1, further comprising outputting, via the processing system, on a display an image of the glenoid from the 3D medical imaging data of the shoulder with a first segmentation ring mask representing the inferior glenoid diameter and a second segmentation ring mask representing the width of the bone lesion both overlayed on the glenoid.

3. The computer-implemented method of claim 1, further comprising outputting, via the processing system, the inferior glenoid diameter, the width of the bone lesion, and the glenoid track width that were calculated.

4. The computer-implemented method of claim 1, wherein utilizing the first trained neural network to localize the glenohumeral joint comprises predicting the glenoid surface segmentation mask and predicting a cylinder segmentation mask having a cylindrical shape that encompasses the glenoid surface segmentation mask.

5. The computer-implemented method of claim 4, further comprising utilizing, via the processing system, the cylinder segmentation mask to crop the 3D medical imaging data of the shoulder to generate the localized view.

6. The computer-implemented method of claim 5, further comprising normalizing and augmenting, via the processing system, the 3D medical imaging data of the shoulder prior to cropping the 3D medical imaging data of the shoulder to generate the localized view.

7. The computer-implemented method of claim 1, further comprising normalizing and augmenting, via the processing system, the 3D medical imaging data of the shoulder prior to utilizing the first trained neural network to localize the glenohumeral joint in the 3D medical imaging data of the shoulder.

8. The computer-implemented method of claim 1, wherein utilizing the defect algorithm to calculate the inferior glenoid diameter, the width of the bone lesion, and the glenoid track width comprises:

fitting the plane derived from the ring segmentation mask;

calculating a contour of the glenoid based on projections of the glenoid surface segmentation mask onto the plane;

parametrizing the ring mask to determine the ring center and diameter; and measuring the width of the bone lesion by finding the lowest distance between glenoid contour and ring center to use as radius.

9. The computer-implemented method of claim 1, wherein the 3D medical imaging data comprises magnetic resonance imaging data acquired utilizing an oZTEo sequence.

10. A system for shoulder lesion measurement, comprising:

a memory encoding processor-executable routines; and a processing system comprising one or more processors and configured to access the memory and to execute the processor-executable routines, wherein the processor-executable routines, when executed by the processing system, cause the processing system to:

obtain three-dimensional (3D) medical imaging data of a shoulder of a subject;

utilize a first trained neural network to localize a glenohumeral joint in the 3D medical imaging data of the shoulder to a localized view utilizing cylinder segmentation;

utilize a second trained neural network to detect a plane containing a circle encompassing a glenoid within the localized view, to utilize circle/ring segmentation to predict a ring segmentation mask from the localized view, and to predict a glenoid surface segmentation mask from the localized view; and utilize a defect algorithm to calculate an inferior glenoid diameter, a width of a bone lesion, and a glenoid track width based on the ring segmentation mask and the glenoid surface segmentation mask.

11. The system of claim 10, wherein the processor-executable routines, when executed by the processing system, further cause the processing system to output on a display an image of the glenoid from the 3D medical imaging data of the shoulder with a first segmentation ring mask representing the inferior glenoid diameter and a second segmentation ring mask representing the width of the bone lesion both overlayed on the glenoid.

12. The system of claim 10, wherein the processor-executable routines, when executed by the processing system, further cause the processing system to output the inferior glenoid diameter, the width of the bone lesion, and the glenoid track width that were calculated.

13. The system of claim 10, wherein utilizing the first trained neural network to localize the glenohumeral joint comprises predicting the glenoid surface segmentation mask and predicting a cylinder segmentation mask having a cylindrical shape that encompasses the glenoid surface segmentation mask.

14. The system of claim 13, wherein the processor-executable routines, when executed by the processing system, further cause the processing system to utilize the cylinder segmentation mask to crop the 3D medical imaging data of the shoulder to generate the localized view.

15. The system of claim 14, wherein the processor-executable routines, when executed by the processing system, further cause the processing system to normalize and augment the 3D medical imaging data of the shoulder prior to cropping the 3D medical imaging data of the shoulder to generate the localized view.

16. The system of claim 10, wherein the processor-executable routines, when executed by the processing system, further cause the processing system to normalize and augment the 3D medical imaging data of the shoulder prior to utilizing the first trained neural network to localize the glenohumeral joint in the 3D medical imaging data of the shoulder.

17. The system of claim 10, wherein utilizing the defect algorithm to calculate the inferior glenoid diameter, the width of the bone lesion, and the glenoid track width comprises:

best fitting a modified circle derived from the ring segmentation mask on the glenoid surface segmentation mask to encompass the glenoid;

best fitting a chord along a line of bone loss within the modified circle;

setting a diameter perpendicular to the chord; and measuring the width of the bone lesion by calculating points inside and outside of an intact portion of the glenoid along lines parallel to the diameter.

18. The system of claim 10, wherein the 3D medical imaging data comprises magnetic resonance imaging data acquired utilizing an oZTEo sequence.

19. A non-transitory computer-readable medium, the computer-readable medium comprising processor-executable code that when executed by a processing system comprising one or more processors, causes the processing system to:

obtain three-dimensional (3D) medical imaging data of a shoulder of a subject;

utilize a first trained neural network to localize a glenohumeral joint in the 3D medical imaging data of the shoulder to a localized view utilizing cylinder segmentation;

utilize a second trained neural network to detect a plane containing a circle encompassing a glenoid within the localized view, to utilize circle/ring segmentation to predict a ring segmentation mask from the localized view, and to predict a glenoid surface segmentation mask from the localized view; and utilize a defect algorithm to calculate an inferior glenoid diameter, a width of a bone lesion, and a glenoid track width based on the ring segmentation mask and the glenoid surface segmentation mask.

20. The non-transitory computer-readable medium of claim 19, wherein the processor-executable code, when executed by the processing system, further causes the processing system to output on a display an image of the glenoid from the 3D medical imaging data of the shoulder with a first segmentation ring mask representing the inferior glenoid diameter and a second segmentation ring mask representing the width of the bone lesion both overlayed on the glenoid.

* * * * *